Dec. 25, 1951     A. ABGARIAN     2,580,265
MOWER STRUCTURE

Filed April 29, 1946     3 Sheets-Sheet 2

INVENTOR.
ARAM ABGARIAN
ATTORNEYS

Dec. 25, 1951  A. ABGARIAN  2,580,265
MOWER STRUCTURE
Filed April 29, 1946  3 Sheets-Sheet 3
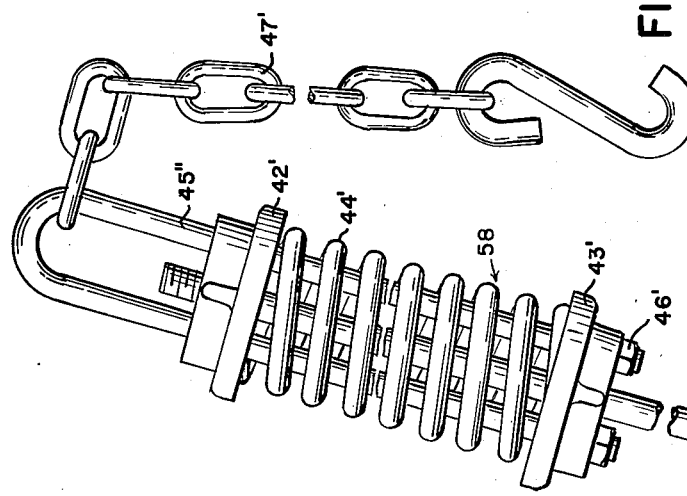
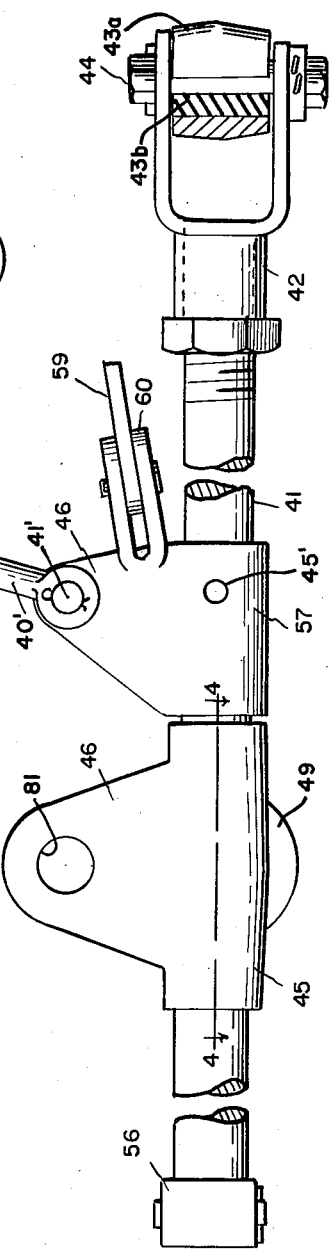
INVENTOR.
ARAM ABGARIAN
BY
ATTORNEYS Patented Dec. 25, 1951

2,580,265

UNITED STATES PATENT OFFICE 2,580,265

MOWER STRUCTURE

Aram Abgarian, Detroit, Mich., assignor to Detroit Harvester Company, Detroit, Mich., a corporation of Michigan Application April 29, 1946, Serial No. 665,765

10 Claims. (Cl. 56—25)

1

This invention relates generally to mowing machines and refers more particularly to mowers of the type adapted for attachment to tractors.

Although tractor operated mowers are used extensively in farm or rural areas where large-scale mowing is required, nevertheless considerable inconvenience and expense has been experienced as a result of damage caused by the cutter bar assembly striking rocks, stumps or other obstructions protruding from the ground over which the mower is operated. One satisfactory method of reducing mower damage from the above cause is to support the mower cutter bar assembly in a manner to enable the same to swing back in response to engagement of the mower bar assembly with ground obstructions.

In the past, the mechanism provided for accomplishing the above result required a relatively large number of parts which greatly increased the cost of the mower and complicated assembly of the latter. It is, therefore, one of the objects of this invention to provide a mower having a cutter bar assembly adapted to swing back upon striking a ground obstruction and having mechanism for effecting this result characterized in that it comprises relatively few parts capable of being inexpensively manufactured, assembled and installed.

Another object of this invention is to provide a mower assembly of the above general type wherein rearward swinging movement of the cutter bar unit is effected without disturbing the driving connection between the power take-off of the tractor and knife of the cutter bar unit, or without actually disconnecting the latter unit from either the mower assembly or tractor.

A further feature of this invention is to provide an arrangement wherein the cutter bar assembly may be returned to and automatically latched in its operative position by merely backing up the tractor.

The foregoing as well as other objects will be made more apparent as this description proceeds, especially when considered in connection with the accompanying drawings, wherein:

Fig. 3 is an enlarged detail view, partly in section, of the pull bar assembly; and Fig. 4 is an enlarged sectional view taken on the line 4—4 of Fig. 3.

Figure 1:
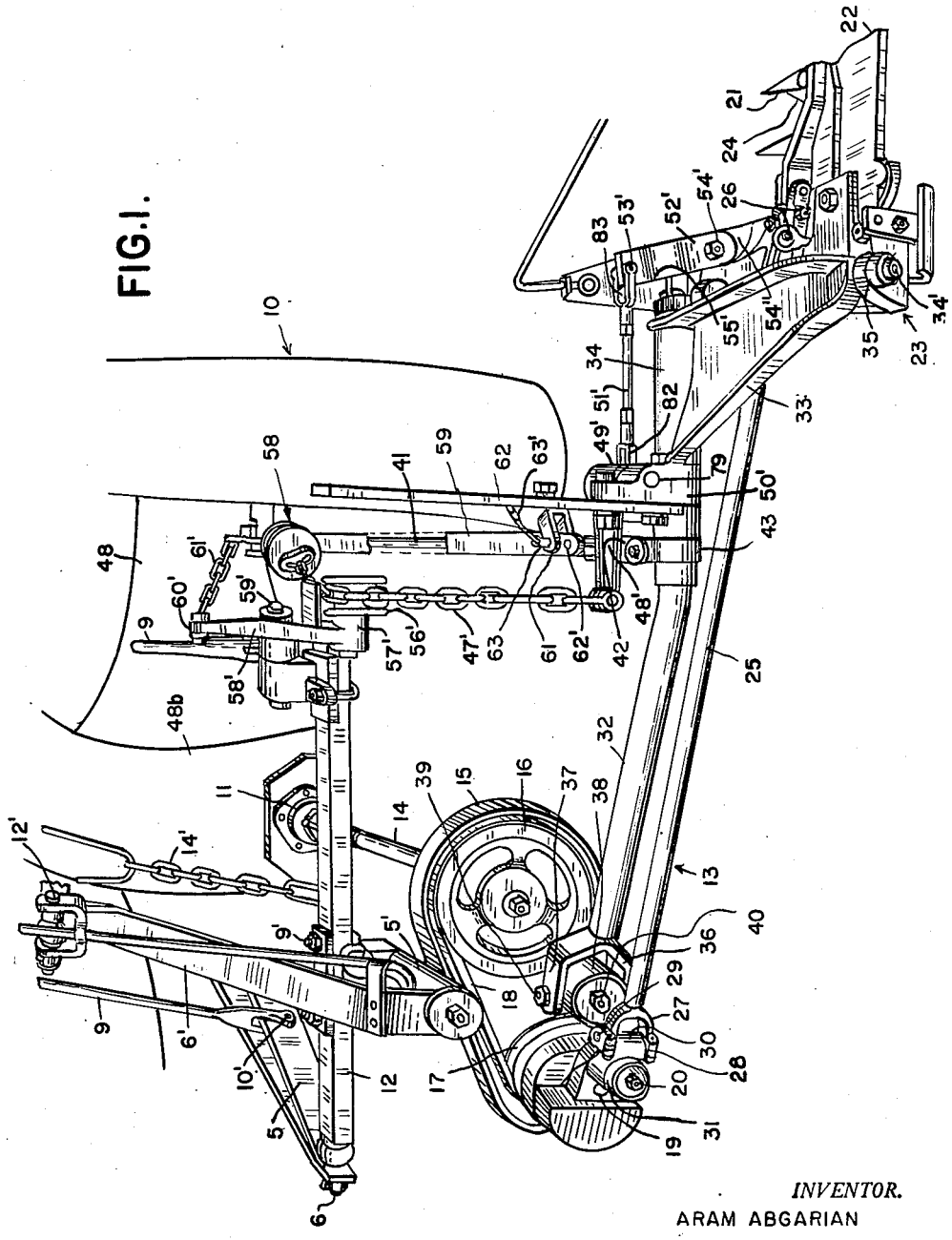
Fig. 1 is a fragmentary perspective view of a mower assembly embodying this invention and showing the same in connection with a tractor.

Upon reference to Fig. 1 of the drawings, it

Figure 2:
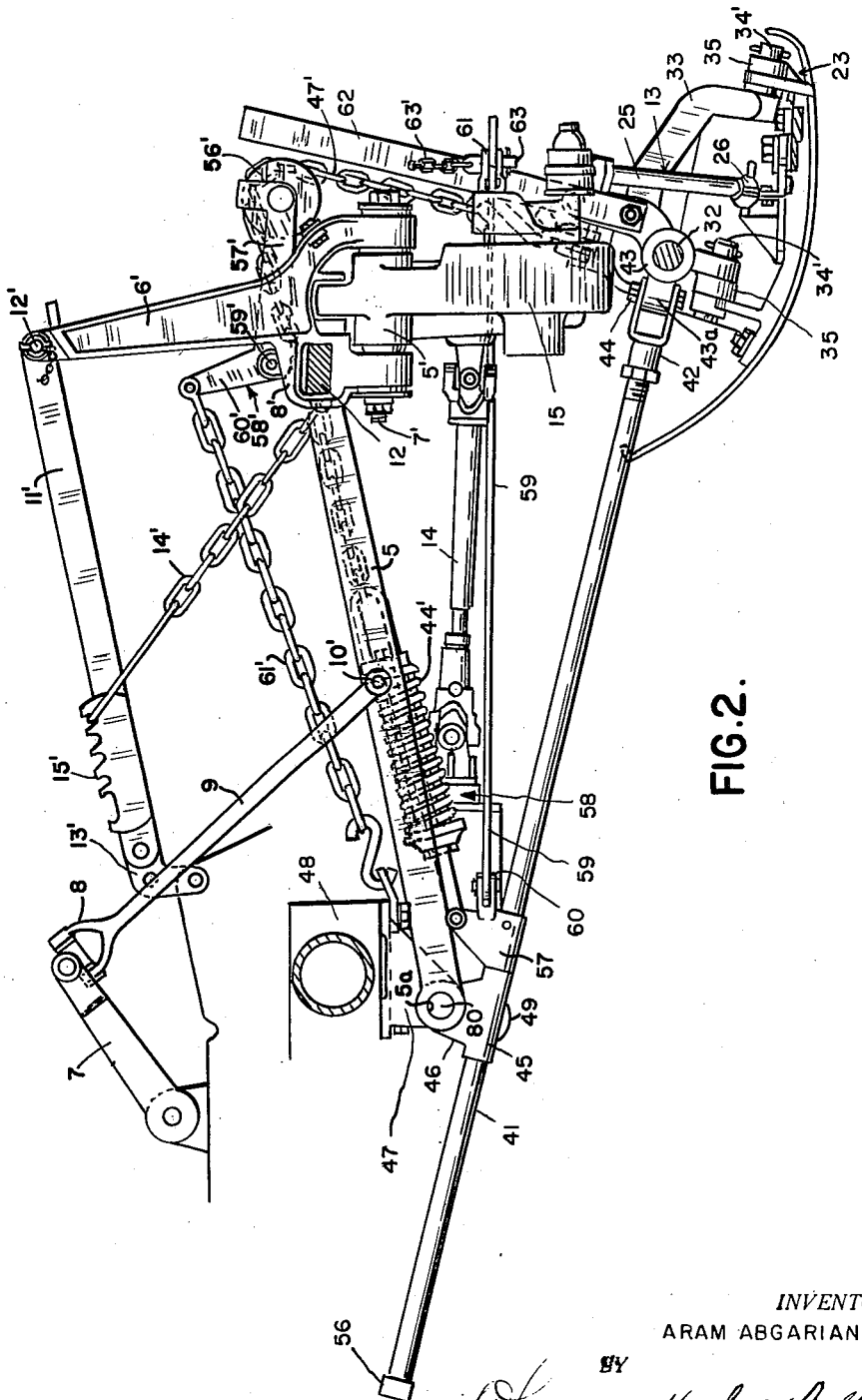
Fig. 2 is an enlarged side elevational view, partly in section, of the mower assembly.

2 will be noted that the reference character 10 indicates a tractor having the usual power take-off mechanism 11 and having a draw bar 12. In accordance with conventional practice the draw bar 12 is pivotally supported on the tractor by a pair of laterally spaced arms 5 having their rear ends respectively pivotally connected to opposite ends of the draw bar 12 and having their forward ends pivoted to the tractor. As best seen in Figures 1 and 2 of the drawings, it will be noted that said arms 5 are pivoted at their rear ends on pivot pins 6 projecting endwise from the ends of the draw bar 12, and are provided at their forward ends with openings 5a for receiving the usual pivot pins (not shown) that are provided therefor on the tractor adjacent the differential housing 48b thereof. Also, in accordance with usual practice, the arms 5 are connected to power operated lift means provided on the tractor. In Figure 2 of the drawings, the power lift means for operating each of the arms 5 includes a lever 7 connected by a coupling 8 to the upper end of a link 9 which in turn has its lower end connected by a pivot pin 10' to the arm 5 intermediate the ends thereof.

The mowing machine embodying the features of this invention is indicated by the numeral 13 and is carried by the draw bar 12. The mower embodies a drive shaft 14 having its forward end coupled to the power take-off mechanism 11 and having its rear end journaled in a support or housing 15 carried by the draw bar 12. In general, the housing 15 has a boss 5', and a pedestal 6' is connected to said boss by a pin 7'. The pedestal 6' has a part 8' apertured to receive the draw bar 12, and the latter is clamped to the part 8' by fastener elements 9'. In order to hold the draw bar 12 in the desired elevated position, the upper end of the pedestal 6' is pivotally connected to the rear end of a link 11' by a pin 12', and the forward end of said link 11' is pivotally connected to a bracket 13' on the tractor. The elevation of the draw bar 12 may be varied by a chain 14' having its rear end secured to the draw bar 12 and having its forward end selectively engageable with teeth 15' carried by the link 11'. A pulley 16 is secured to the rear end of the drive shaft 14 and is operatively connected to a second pulley 17 by a belt 18 reeved around both pulleys. The pulley 17 is fixed to a driven shaft 19 journaled in the housing 15, and is provided in eccentric relation to said shaft 19 with a laterally projecting pin 20.

A cutter bar assembly 21 normally extends laterally outwardly from one side of the tractor at the rear end thereof and has a bar 22 secured at its inner end to a ground engaging shoe 23. The bar 22 forms a support for the usual reciprocable knife 24 which in turn is provided at its inner end with a universal connection 26 with the outer end of a pitman rod 25. A yoke 27 is provided at the inner end of the pitman rod 25, and the furcations of said yoke are formed with vertically aligned split bearings 28 that are clamped upon a vertical pivot pin 29. The pin 29 is journaled in a bushing 30 formed integral with a collar 31 rotatably supported on the eccentric pin 20. As a result of the above construction, rotation of the eccentric pin 20 by the driven shaft 19 imparts a reciprocable movement to the pitman rod 25 and the cutter or knife 24, and the pitman rod 25 may be swung rearwardly about the pivot pin 29 from the position thereof shown in Fig. 1 of the drawings without interfering with the driving connection.

In accordance with conventional practice the cutter bar assembly 21 may be swung upwardly from the horizontal position shown in Fig. 1 of the drawings to a substantially vertical or inoperative position and may also be tilted about its longitudinal axis. For accomplishing the above result, the shoe 23 is connected to the outer end of a drag bar 32 by a coupling member 33. The drag bar 32 extends in the general direction of length of the cutter bar 22, and the coupling member 33 has a portion 34 journaled on the outer end of the drag bar to afford the tilting motion aforesaid of the cutter bar assembly about its longitudinal axis. As shown in Fig. 2 of the drawings, the coupling member is formed with aligned pins 34' having their common axis extending at right angles to the axis of tilting movement of the coupling member 33 and journaled in bearings 35 formed on the shoe 23 to permit the vertical swinging movement aforesaid of the cutter bar assembly.

The inner end of the drag bar 32 is formed with a yoke 36 having vertically spaced furcations 37 located at opposite sides of a collar 38 and pivoted to the collar 38 by vertically aligned pins 39. The collar 38 is journaled on a stub shaft 40 anchored in the housing 15 and having its axis extending parallel to the axes of the drive and driven shafts. Thus, the drag bar 32 may also be swung rearwardly about the pins 39 from the position shown in Fig. 1 of the drawings.

Inasmuch as both the pitman rod 25 and the drag bar 32 may be swung rearwardly relative to the driving mechanism and draw bar 12, it follows that the cutter bar assembly may also be displaced in a rearward direction from the position shown in Fig. 1 of the drawings. Actually the cutter bar assembly 21 swings rearwardly about the aligned pivot pins 39 connecting the drag bar 32 to the support or housing 15. The pitman rod 25, on the other hand, swings about the vertical pin 29, and the offset relationship between the latter pin and the pins 39 is compensated for by shifting movement of the knife or cutter 24 connected to the outer end of the pitman. Thus, rearward swinging movement of the cutter assembly 21, drag bar 32 and pitman rod 25 is permitted without binding of the parts.

The rearward swinging movement of the cutter bar assembly 21 is normally resisted by a pull bar 41 having a yoke 42 secured to the rear end thereof. The yoke 42 has a universal connection with the drag bar 32. Such universal connection is provided by a collar 43 rotatably mounted on the drag bar 32 and having a forwardly projecting portion 43a extending between and pivotally connected by a vertical pin 44 to the furcations of the yoke 42. A bushing 43b surrounds pin 44. The pull bar 41 is slidably supported intermediate its ends in a sleeve 45 having an upstanding web 46 mounted on a laterally projecting pivot pin 80 of a bracket 47 which in turn is secured to the rear axle housing 48 of the tractor. For this purpose, the web 46 has an opening 81 for receiving said pin 80. Any suitable means such as a removable pin (not shown) may extend through the pivot pin 80 adjacent the free end thereof to prevent accidental displacement of the web 46 therefrom. By referring to Fig. 2 of the drawings, it will be noted that the pin 80 is in axial alignment with the opening 5a in the arm 5. The bracket 47 and sleeve 46 are located at the right side of the tractor, the bracket 47 being secured to the axle housing 48 laterally outwardly or to the right of the differential housing, which of course is located on the longitudinal center line of the vehicle. The arms 5, as previously stated, are pivoted to pins adjacent the differential housing. Accordingly, the arm 5 at the right of the tractor, as seen in Figure 2, is spaced inwardly or to the left of the bracket 47 and sleeve 46. This relationship is clearly evident from Figure 1, where draw bar 41 is seen to be to the right of link 9. As shown in Fig. 4 of the drawings, the sleeve 45 is provided intermediate its ends with a lateral extension 49 for housing a latch mechanism 50. The latch mechanism 50 comprises a slidable plunger 51 having a cam portion 52 at its inner end engageable within a correspondingly shaped notch 53 in the pull bar 41. The cam portion 52 of the plunger is normally urged into engagement with the notch 53 by a coil spring 54 within the extension 49. The inner end of said spring 54 abuts the outer end of the plunger 51 while the outer end of said spring abuts an adjustable cap 55 threadably engaging the outer end of the extension.

The tension of the coil spring 54 may be varied by adjusting the cap 55, and the force exerted on the plunger 51 by the coil spring 54 is predetermined to maintain the plunger 51 in its latched position or, in other words, to secure the pull bar against movement throughout normal operation of the mower. However, should the cutter bar assembly 21 engage a rock, stump, or other obstruction protruding above the ground, an abnormal thrust is imparted to the cutter bar assembly tending to swing the latter rearwardly. This force is transmitted to the pull bar 41 with the result that the plunger 51 is cammed outwardly against the action of the spring 54 to release the pull bar 41. Upon release of the latch mechanism the pull bar 41 is free to slide rearwardly in the sleeve 45 in response to the abnormal force applied to the cutter bar assembly 21 and, as a consequence, the latter assembly is relieved from destructive shocks. The extent of rearward displacement of the cutter bar assembly is determined by the length of the pull bar 41 and is limited by engagement of a stop 56 on the forward end of the pull bar 41 with the adjacent end of the sleeve 45. As previously described, the pitman rod 25 and the drag bar 32 swing with the cutter bar assembly 21 without disconnecting or otherwise disturbing the driving connection. The above arrangement is such that the cutter bar assembly may be readily returned to its operative position by merely backing-up the tractor. As the tractor is backed-up, the pull bar 41 slides forwardly relative to the sleeve 45 until the latch plunger 51 snaps into engagement with the notch 53 in the pull bar.

As shown in Figs. 2 and 3, a second sleeve 57 is secured to the pull bar 41 in rear of the sleeve 45 by a pin 45'. This sleeve 57 forms an anchorage means for a counterbalancing spring unit 58 and for a link 59 of a tilting mechanism. The arrangement is such that rearward movement of the pull bar 41 upon swing back of the cutter bar assembly also enables the counterbalancing unit and tilting mechanism to move back freely with the pull bar. As a result, there is no tendency for the parts to bend or jam as the cutter bar is swung back.

The purpose of the counterbalancing unit is to assist in swinging the cutter bar assembly about the pivots 34' from the operative horizontal position shown in Figure 1 of the drawings to a substantially upright or vertical position. In general the counterbalancing unit comprises a rod 40' having its lower end pivoted to the sleeve 57 by a pin 41' and having an abutment 42' suitably anchored thereon adjacent its upper end. An abutment 43' is slidably supported on the rod 40' adjacent the lower end thereof, and a coil spring 44' surrounds the rod 40' between the abutments 42' and 43'. Such abutments are each formed with laterally spaced openings for receiving the legs of a U-shaped bolt 45''. The abutment 52' slidably engages the legs of the bolt 45'' but the abutment 43' is held in assembled relation with the bolt by nuts 46' threadably engaging the free ends of the legs of the bolt.

The upper end of the bolt 45'' is connected to the forward end of a chain 47' or other flexible linear member that is connected at its rear end to one arm 48' of a bell crank lever 49' pivoted at 79 on a part 50' of the coupling member 33. The other arm (not shown) of the bell crank lever is pivotally connected to a yoke 82 on the inner end of a rod 51'. This rod 51' has a yoke 83 at its outer end pivotally connected by a pin 53' to the upper end of a lever 52'. The lever 52' is pivotally connected adjacent its lower end by a pin 54' to an upstanding lug 54'' of the shoe 23, and the inner edge of the lever 52' at a point above the pin 54' abuts an upstanding part 55' of the shoe 23. It will also be noted that the chain 47' extends over a pulley or guide sheave 56' supported on one arm 57' of a bell crank lever 58' pivoted at 59' on the draw bar 12. The other arm 60' of the lever 58' is connected by a chain 61' to the bracket 47 on the tractor. Thus the spring 44' normally applies a yieldable force to the cutter bar through the chain 47' tending to swing the cutter bar in an upward direction about the pivots 34'.

The tilting mechanism comprising an upright hand lever 62 rigidly secured at its lower end to the part 50' of the coupling member 33, a yoke 61 rigidly secured to one side of the hand lever, a link 59 pivotally connected at its forward end to an arm 60 of the sleeve 57 and extending rearwardly between the furcations of said yoke 61, and a pin 63 connected by a chain 63' to the hand lever 62 and engageable with vertically aligned openings in the furcations of the yoke and with any one of a series of openings 62' in the link 59. Thus, by removing the pin 63 from the aligned openings in the yoke 61 and one of the openings 62' in the link 59, and then moving the hand lever 62 forwardly or rearwardly as desired until another of the openings 62' in the link 59 is in registration with the vertically aligned openings in the yoke 61, the tilting adjustment of the cutter bar assembly may be obtained. Such adjustment may then be maintained by inserting the pin 63 into the registering openings in the yoke 61 and link 59.

What I claim as my invention is:

1. In a tractor having a frame, a drag bar normally extending transversely of said frame and having one end connected thereto for vertical and rearward swinging, a cutter bar connected to the other end of said drag bar for vertical swinging and for adjustment about its longitudinal axis relative to said drag bar; supporting mechanism comprising a pull bar extending forwardly from said drag bar and pivotally connected thereto, a sleeve fixed to the frame of said tractor through which said pull bar is slidable, latch means carried by said sleeve and engageable with said pull bar to restrain rearward sliding movement of said pull bar, said latch means being yieldable in response to the application of an abnormal stress in a rearward direction against the cutter bar to permit rearward sliding movement of said pull bar, and simultaneous rearward swinging movement of said drag bar and cutter bar, said pull bar having an abutment thereon forwardly of said sleeve to limit rearward movement of said pull bar.

2. In a tractor having a frame, a drag bar normally extending transversely of said frame and having one end connected thereto for vertical and rearward swinging, a cutter bar connected to the other end of said drag bar for vertical swinging and for adjustment about its longitudinal axis relative to said drag bar; supporting mechanism comprising a pull bar extending forwardly from said drag bar and pivotally connected thereto, a sleeve fixed to the frame of said tractor through which said pull bar is slidable, latch means carried by said sleeve and engageable with said pull bar to restrain rearward sliding movement of said pull bar, said latch means being yieldable in response to the application of an abnormal stress in a rearward direction against the cutter bar to permit rearward sliding movement of said pull bar, and simultaneous rearward swinging movement of said drag bar and cutter bar, said pull bar having an abutment thereon forwardly of said sleeve to limit rearward movement of said pull bar, an anchorage member fixed to said pull bar rearwardly of said sleeve, a lever fixed to said cutter bar, and a link connecting said lever and said anchorage member.

3. In a tractor having a frame, a drag bar normally extending transversely of said frame and having one end connected thereto for vertical and rearward swinging, a cutter bar connected to the other end of said drag bar for vertical swinging and for adjustment about its longitudinal axis relative to said drag bar; supporting mechanism comprising a pull bar extending forwardly from said drag bar and pivotally connected thereto, a sleeve fixed to the frame of said tractor through which said pull bar is slidable, latch means carried by said sleeve and engageable with said pull bar to restrain rearward sliding movement of said pull bar, said latch means being yieldable in response to the application of an abnormal stress in a rearward direction against the cutter bar, and simultaneous rearward sliding movement of said drag bar and cutter bar, said pull bar having an abutment thereon forwardly of said sleeve to limit rearward movement of said pull bar, an anchorage member fixed to said pull bar rearwardly of said sleeve, and counterbalance means for said cutter bar comprising a lever mounted on said drag bar, means connecting said lever to said cutter bar to exert a force on said cutter bar tending to swing it vertically, a flexible member connected to said lever, and a tension spring connected between said flexible member and said anchorage member.

4. In a tractor having a frame including a rear axle structure, a drag bar located rearwardly of said rear axle structure and normally extending transversely of said frame and having one end connected thereto for vertical and rearward swinging, a cutter bar connected to the other end of said drag bar for vertical swinging and for adjustment about its longitudinal axis relative to said drag bar; supporting mechanism comprising a pull bar extending forwardly from said drag bar and pivotally connected thereto, a sleeve fixed to the frame of said tractor beneath said rear axle structure through which said pull bar is slidable, latch means carried by said sleeve and engageable with said pull bar to restrain rearward sliding movement of said pull bar, said latch means being yieldable in response to the application of an abnormal stress in a rearward direction against the cutter bar to permit rearward sliding movement of said pull bar, and simultaneous rearward swinging movement of said drag bar and cutter bar, said pull bar having an abutment thereon forwardly of said sleeve to limit rearward movement of said pull bar.

5. In a tractor having a frame including a rear axle structure, a drag bar located rearwardly of said rear axle structure and normally extending transversely of said frame and having one end connected thereto for vertical and rearward swinging, a cutter bar connected to the other end of said drag bar for vertical swinging and for adjustment about its longitudinal axis relative to said drag bar; supporting mechanism comprising a pull bar extending forwardly from said drag bar and pivotally connected thereto, a sleeve fixed to the frame of said tractor beneath said rear axle structure through which said pull bar is slidable, latch means carried by said sleeve and engageable with said pull bar to restrain rearward sliding movement of said pull bar, said latch means being yieldable in response to the application of an abnormal stress in a rearward direction against the cutter bar to permit rearward sliding movement of said pull bar, and simultaneous rearward swinging movement of said drag bar and cutter bar, said pull bar having an abutment thereon forwardly of said sleeve to limit rearward movement of said pull bar, an anchorage member fixed to said pull bar rearwardly of said sleeve, a lever fixed to said cutter bar, and a link connecting said lever and said anchorage member.

6. In a tractor having a frame including a rear axle structure, a drag bar located rearwardly of said rear axle structure and normally extending transversely of said frame and having one end connected thereto for vertical and rearward swinging, a cutter bar connected to the other end of said drag bar for vertical swinging and for adjustment about its longitudinal axis relative to said drag bar; supporting mechanism comprising a pull bar extending forwardly from said drag bar and pivotally connected thereto, a sleeve fixed to the frame of said tractor beneath said rear axle structure through which said pull bar is slidable, latch means carried by said sleeve and engageable with said pull bar to restrain rearward sliding movement of said pull bar, said latch means being yieldable in response to the application of an abnormal stress in a rearward direction against the cutter bar to permit rearward sliding movement of said pull bar, and simultaneous rearward swinging movement of said drag bar and cutter bar, said pull bar having an abutment thereon forwardly of said sleeve to limit rearward movement of said pull bar, an anchorage member fixed to said pull bar rearwardly of said sleeve, and counterbalance means for said cutter bar comprising a lever mounted on said drag bar, means connecting said lever to said cutter bar to exert a force on said cutter bar tending to swing it vertically, a flexible member connected to said lever, and a tension spring connected between said flexible member and said anchorage member.

7. In a tractor having a frame including a rear axle structure, a draw bar located rearwardly from said rear axle structure, and parallel thereto, pivot means mounting said draw bar for vertical swinging movement, a drag bar pivoted at one end to said draw bar for vertical and rearward swinging movement, a cutter bar pivoted to the other end of said drag bar for vertical swinging movement and for angular adjustment about its longitudinal axis; supporting mechanism comprising a pull bar extending forwardly from said drag bar and pivotally connected thereto, a sleeve fixed to the frame of said tractor beneath said rear axle structure through which said pull bar is slidable, latch means carried by said sleeve and engageable with said pull bar to restrain rearward sliding movement of said pull bar, said latch means being yieldable in response to the application of an abnormal stress in a rearward direction against the cutter bar to permit rearward sliding movement of said pull bar, and simultaneous rearward swinging movement of said drag bar and cutter bar, said pull bar having an abutment thereon forwardly of said sleeve to limit rearward movement of said pull bar.

8. In a tractor having a frame including a rear axle structure, a draw bar located rearwardly from said rear axle structure, and parallel thereto, pivot means mounting said draw bar for vertical swinging movement, a drag bar pivoted at one end to said draw bar for vertical and rearward swinging movement, a cutter bar pivoted to the other end of said drag bar for vertical swinging movement and for angular adjustment about its longitudinal axis; supporting mechanism comprising a pull bar extending forwardly from said drag bar and pivotally connected thereto, a sleeve fixed to the frame of said tractor beneath said rear axle structure through which said pull bar is slidable, latch means carried by said sleeve and engageable with said pull bar to restrain rearward sliding movement of said pull bar, said latch means being yieldable in response to the application of an abnormal stress in a rearward direction against the cutter bar to permit rearward sliding movement of said pull bar, and simultaneous rearward swinging movement of said drag bar and cutter bar, said pull bar having an abutment thereon forwardly of said sleeve to limit rearward movement of said pull bar, an anchorage member fixed to said pull bar rearwardly of said sleeve, a lever fixed to said cutter bar, and a link connecting said lever and said anchorage member.

9. In a tractor having a frame including a rear axle structure, a draw bar located rearwardly from said rear axle structure, and parallel thereto, pivot means mounting said draw bar for vertical swinging movement, a drag bar pivoted at one end to said draw bar for vertical and rearward swinging movement, a cutter bar pivoted to the other end of said drag bar for vertical swinging movement and for angular adjustment about its longitudinal axis; supporting mechanism comprising a pull bar extending forwardly from said drag bar and pivotally connected thereto, a sleeve fixed to the frame of said tractor beneath said rear axle structure through which said pull bar is slidable, latch means carried by said sleeve and engageable with said pull bar to restrain rearward sliding movement of said pull bar, said latch means being yieldable in response to the application of an abnormal stress in a rearward direction against the cutter bar to permit rearward sliding movement of said pull bar, and simultaneous rearward swinging movement of said drag bar and cutter bar, said pull bar having an abutment thereon forwardly of said sleeve to limit rearward movement of said pull bar, an anchorage member fixed to said pull bar rearwardly of said sleeve, and counterbalance means for said cutter bar comprising a lever mounted on said drag bar, means connecting said lever to said cutter bar to exert a force on said cutter bar tending to swing it vertically, a flexible member connected to said lever, and a tension spring connected between said flexible member and said anchorage member.

10. In a tractor having a frame, a drag bar extending transversely of the frame and connected thereto at one end for rearward swinging movement, a mower arm connected to the other end of said drag bar for angular adjustment about the axis thereof, break back controlling mechanism comprising a sleeve carried by said frame forwardly of said drag bar, a pull bar slidable in said sleeve, an abutment on said pull bar forwardly of said sleeve, the rear end of said sleeve being pivoted to said drag bar, said sleeve having a laterally extending housing, a spring in said housing, a plunger slidably received in said housing having one end engaging a side of said pull bar and its other end engaged by said spring, said bar having a recess therein provided with inclined camming walls, the end of said plunger being shaped to enter said recess to latch said bar in predetermined position, said plunger being cammed out of said recess to release said pull bar upon the application of excessive force tending to swing said cutter bar rearwardly.

ARAM ABGARIAN.

REFERENCES CITED

The following references are of record in the file of this patent:

UNITED STATES PATENTS

| Number | Name | Date |
|---|---|---|
| 1,584,798 | Atwell | May 18, 1926 |
| 1,772,264 | Pearson | Aug. 5, 1930 |
| 2,204,334 | Wagner | June 11, 1940 |
| 2,214,162 | Clapper | Sept. 10, 1940 |
| 2,304,421 | Rogers | Dec. 8, 1942 |
| 2,354,710 | Simpson et al. | Aug. 1, 1944 |
| 2,502,805 | Spurlin | Apr. 4, 1950 |